(12) United States Patent
Yajima et al.

(10) Patent No.: US 7,523,431 B2
(45) Date of Patent: Apr. 21, 2009

(54) SEMICONDUCTOR INTEGRATED CIRCUIT

(75) Inventors: Hiroshi Yajima, Sagamihara (JP); Kaoru Ishida, Shijyonawate (JP)

(73) Assignee: Panasonic Corporation, Osaka (JP)

( * ) Notice: Subject to any disclaimer, the term of this patent is extended or adjusted under 35 U.S.C. 154(b) by 283 days.

(21) Appl. No.: 11/055,085

(22) Filed: Feb. 11, 2005

(65) Prior Publication Data

US 2005/0186934 A1 Aug. 25, 2005

(30) Foreign Application Priority Data

Feb. 19, 2004 (JP) ............................. 2004-042428

(51) Int. Cl.
G06F 9/455 (2006.01)
G06F 17/50 (2006.01)

(52) U.S. Cl. ....................................................... 716/11
(58) Field of Classification Search ................ 716/8–14
See application file for complete search history.

(56) References Cited

U.S. PATENT DOCUMENTS

| 5,424,629 A | 6/1995 | Fujiwara et al. |
| 6,384,676 B2 | 5/2002 | Kasa et al. |
| 6,479,869 B1 * | 11/2002 | Hiraga ........................ 257/350 |
| 6,492,716 B1 * | 12/2002 | Bothra et al. ............... 257/678 |
| 6,501,330 B2 | 12/2002 | Kasa et al. |
| 6,879,023 B1 * | 4/2005 | Gutierrez ..................... 257/547 |
| 2004/0017111 A1 * | 1/2004 | May ............................. 307/31 |
| 2004/0104732 A1 * | 6/2004 | Oosawa et al. .............. 324/613 |
| 2004/0155730 A1 * | 8/2004 | Iwamoto et al. ............. 333/193 |
| 2004/0166815 A1 * | 8/2004 | Maligeorgos et al. ......... 455/73 |
| 2004/0222833 A1 * | 11/2004 | Lin et al. ..................... 327/162 |

FOREIGN PATENT DOCUMENTS

| JP | 5-167410 | 7/1993 |
| JP | 2001-244416 | 9/2001 |
| JP | 2003-324156 | 11/2003 |

OTHER PUBLICATIONS

Japanese Office Action issued in Japanese Application No. 2004-042428 mailed on Jul. 31, 2007.

* cited by examiner

*Primary Examiner*—Jack Chiang
*Assistant Examiner*—Suresh Memula
(74) *Attorney, Agent, or Firm*—Wenderoth, Lind & Ponack, L.L.P.

(57) ABSTRACT

An semiconductor integrated circuit that reduces the influence of noise from a digital circuit block on an analog circuit block, both the circuit blocks being integrated on the same semiconductor substrate. In the wiring that passes through near the analog circuit block and the digital circuit block, having a grounding unit that performs alternate grounding makes it possible to reduce the influence of noise from the digital circuit block on the analog circuit block.

2 Claims, 4 Drawing Sheets

SEMICONDUCTOR INTEGRATED CIRCUIT

BACKGROUND OF THE INVENTION (1) Field of the Invention

The present invention relates to a semiconductor integrated circuit which reduces the influence of noise from the digital circuit block, on the analog circuit block, both the circuit blocks being formed on the same semiconductor substrate.

(2) Description of the Related Art

FIG. 1 shows an example of a block diagram of a mobile phone. The signal received by an antenna 101 is amplified and demodulated in the receiving unit 200 through the antenna switch 102, and processed in the baseband processing unit 500 and the control processing unit 600. After that, the signal is outputted to the speaker unit 701 as sound, or to the display unit 702 as an image. On the other hand, the signal inputted through the input unit 703 is processed in the control processing unit 600 and the baseband processing unit 500, modulated and amplified in the sending unit 400, and is sent from the antenna 101 through the antenna switch 102. The local unit 300 generates a local signal and supplies it to the receiving unit 200 and the sending unit 400.

The receiving unit 200 includes a low noise amplifier 201 that amplifies receiving signals, a band limitation filter 202 that removes unnecessary waves of the output signal in the low noise amplifier 201, and a demodulator 203 that demodulates the output of the band limitation filter 202. On the other hand, the sending unit 400 includes a modulator 401 that performs modulation based on the output signal of the baseband processing unit 500, a band limitation filter 402 that removes unnecessary waves of the output signal of the modulator 401, and an electric amplifier 403 that amplifies the output signal of the band limitation filter 402. The local signal generated in the local unit 300 is supplied to the demodulator 203 and the modulator 401.

Recently, mobile apparatuses represented by mobile phones have been downsized, and display devices have been upsized and have been made more multifunctional. Accompanied by this, wireless parts are desired to be downsized. However, for example, in a block diagram of a conventional mobile phone shown in FIG. 1, the low noise amplifier 201, the demodulator 203, the modulator 401, the local unit 300 and the like are made into a semiconductor circuit independently. This is the cause of the problem that many numbers of components are needed and a bigger area for mounting such components is also needed.

In order to solve this problem, as shown in an example of a block diagram shown in FIG. 2, a semiconductor integrated circuit 100 into which the low noise amplifier 201, the demodulator 203, the modulator 401, and the local unit 300 are integrated has developed.

FIG. 3 shows an example of a layout diagram of a semiconductor integrated circuit 100 on the semiconductor substrate. In the synthesizer circuit 3 that is one of the circuits integrated on the semiconductor substrate 1 and that constitutes a part of the local unit 300, digital processing is performed resulting in generating noise. In order to reduce the influence of the noise generated by the synthesizer circuit 3 on the receiving properties of the low noise amplifier circuit 2 that is also one of the circuits integrated on the semiconductor substrate 1 and that constitutes the low noise amplifier 201, the low noise amplifier 2 and the synthesizer circuit 3 are formed in a way that the distance between the blocks of both circuits is sufficiently large.

Also, as shown in document 1: Japanese-Laid Open Patent application No. 2001-244416 publication (FIG. 4 and FIG. 5), a similar effect can be obtained by placing a circuit that is hardly affected by the circuit being a noise source between the low noise amplifier circuit 2 and the synthesizer circuit 3.

SUMMARY OF THE INVENTION

However, from a continuous study of how to reduce the influence of noise generated in the synthesizer 3, it is revealed, as shown in FIG. 3, that the wiring pattern 4 that passes through near the low noise amplifier circuit 2 and near the synthesizer circuit 3 propagate the noise generated in the synthesizer circuit 3 to the low noise amplifier circuit 2. The wiring pattern 4 is for communicating a control signal from the control signal input terminal 42 to the control circuit 41.

Further, as another result from the study, it is revealed, as shown in FIG. 4, a seal ring 6 that passes through near the low noise amplifier circuit 2 and near the synthesizer circuit 3 propagates the noise generated in the synthesizer circuit 3 to the low noise amplifier circuit 2. The seal ring 6 is formed in the outer periphery of the semiconductor substrate 1. It is for reducing the stress generated at the time of dicing and preventing moisture and the like from entering.

An object of the present invention is, in a digital circuit block and an analog circuit block that are integrated in the same semiconductor substrate, to reduce the propagation of noise from the digital circuit block to the analog circuit block through the wiring pattern that passes through near the analog circuit block and digital circuit block.

The semiconductor integrated circuit of the present invention includes (i) a first circuit block, (ii) a second circuit block and (iii) a wiring pattern that passes through near the first circuit block and near the second circuit block, which are formed on the same semiconductor substrate, the semiconductor integrated circuit including a grounding unit that alternately (in AC) grounds the wiring pattern.

In a first aspect of the present invention, in the semiconductor integrated circuit, the wiring pattern transfers a signal for controlling a circuit block that is different from the first circuit block and the second circuit block.

In a first aspect of the present invention, in the semiconductor integrated circuit, the grounding unit performs grounding through one or more bypass capacitors.

In a first aspect of the present invention, in the semiconductor integrated circuit, the wiring pattern is formed on an outer periphery of the semiconductor substrate, and is a seal ring that is near the first circuit block and near the second circuit block.

In a first aspect of the present invention, in the semiconductor integrated circuit, the grounding unit performs grounding at one or more points of the wiring pattern.

In a first aspect of the present invention, in the semiconductor integrated circuit, the grounding unit is different from grounding unit of the first circuit block and the second circuit block.

In a first aspect of the present invention, in the semiconductor integrated circuit, one of the first circuit block and the second circuit block is a digital circuit block, and the other circuit block is an analog circuit block.

In a seventh aspect of the present invention, in the semiconductor integrated circuit, the digital circuit block is a synthesizer circuit.

In a seventh aspect of the present invention, in the semiconductor integrated circuit, the digital circuit block is a logic control circuit.

In a seventh aspect of the present invention, in the semiconductor integrated circuit, the analog circuit block is a low noise amplifier circuit.

In a seventh aspect of the present invention, in the semiconductor integrated circuit, the analog circuit block is a voltage control oscillation circuit.

A mobile communication terminal of the present invention that has at least a sending unit, a receiving unit, a local unit, a baseband unit, and a control processing unit, the mobile communication terminal including a semiconductor integrated circuit that has (i) a first circuit block, (ii) a second circuit block and (iii) a wiring that passes through near the first circuit block and near the second circuit block, which are formed on the same semiconductor substrate, the semiconductor integrated circuit including a grounding unit that alternately grounds the wiring.

A mobile communication base station of the present invention that has at least a sending unit, a receiving unit, a local unit, a baseband unit, and a control processing unit, the mobile communication base station including a semiconductor integrated circuit that has (i) a first circuit block, (ii) a second circuit block and (iii) a wiring that passes through near the first circuit block and near the second circuit block, which are formed on the same semiconductor substrate, including a grounding unit that alternately grounds the wiring.

With the semiconductor integrated circuit in the present invention, in the digital circuit block and the analog circuit block that are integrated on the same semiconductor substrate, it becomes possible to reduce the propagation of noise generated in the digital circuit block to the analog circuit block via the wiring pattern that passes through near the analog circuit block and near the digital circuit block.

Further, employing this semiconductor integrated circuit as a semiconductor integrated circuit that constitutes a mobile phone makes it possible to reduce the deterioration in properties of the mobile phone. Also, employing this semiconductor integrated circuit for a mobile communication base station makes it possible to reduce the deterioration in properties of the mobile communication base station like in the case of the mobile phone.

FURTHER INFORMATION ABOUT TECHNICAL BACKGROUND TO THIS APPLICATION

The disclosure of Japanese Patent Application No. 2004-042428 filed on Feb. 19th, 2004 including specification, drawings and claims is formed herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

First Embodiment

Figure 3:
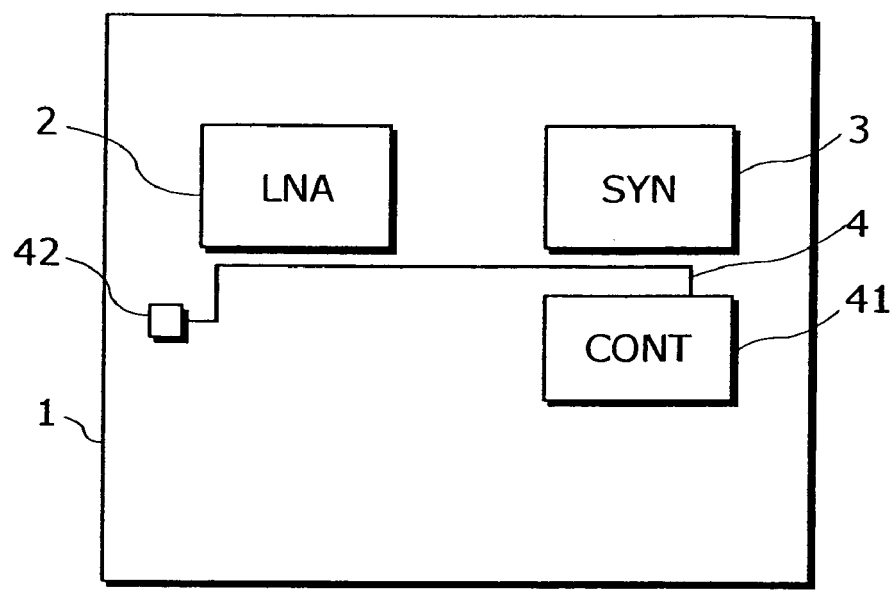
FIG. 3 is a layout diagram of a conventional semiconductor integrated circuit on a semiconductor substrate.
Figure 5:
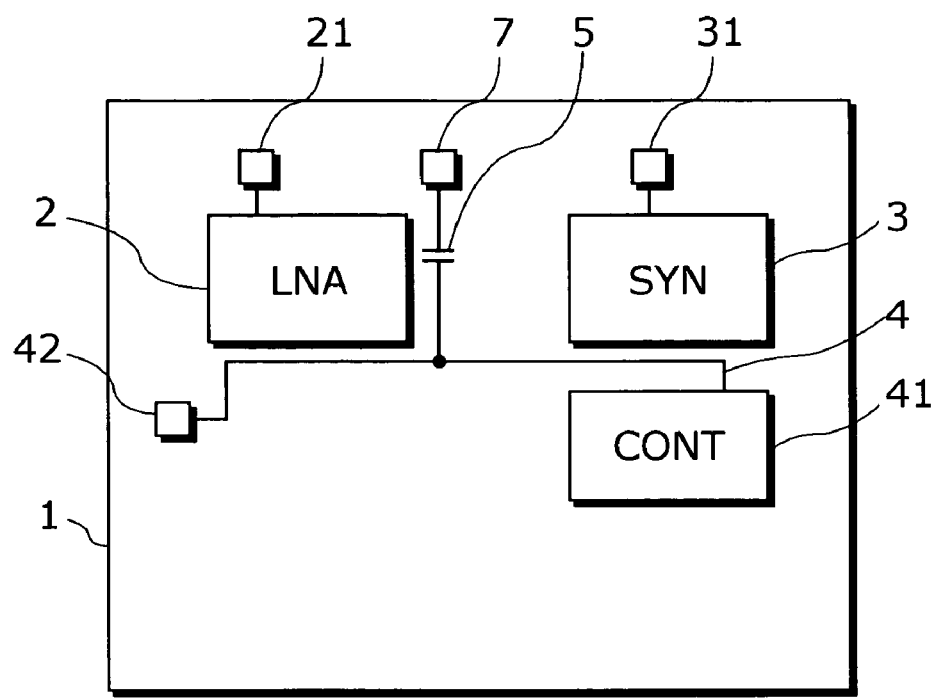
FIG. 5 is a layout diagram of a semiconductor integrated circuit on a semiconductor substrate, the layout diagram being for describing a first embodiment of the present invention.

FIG. 5 is a layout diagram of a semiconductor integrated circuit on a semiconductor substrate, the layout diagram being for describing a first embodiment of the present invention. As shown in the figure, the semiconductor integrated circuit of this embodiment is obtained by adding a capacitor 5 and a grounding terminal 7 to a conventional semiconductor integrated circuit on the semiconductor substrate shown in the layout diagram of FIG. 3. To the parts the same as the ones in FIG. 3 the respectively corresponding reference numbers are assigned.

The semiconductor integrated circuit on the semiconductor substrate 1 includes a low noise amplification circuit 2, a synthesizer circuit 3, a wiring pattern 4 that transmits a control signal inputted through a control signal input terminal 42 to a control circuit 41, a grounding terminal 21 of the low noise amplifier circuit 2, a grounding terminal 31 of the synthesizer circuit 3, and a capacitor 5, one of whose terminals is connected to the wiring pattern 4 and the other of whose terminals is connected to the grounding terminal 7.

Note that, in the claims of the present invention, the low noise amplifier circuit 2 is an example of an analog circuit block, the synthesizer circuit 3 is an example of a digital circuit block, the wiring pattern 4 is an example of the wiring pattern for controlling a circuit different from the two blocks of the digital circuit block and the analog circuit block, the capacitor 5 is an example of a bypass capacitor that constitutes the grounding unit, and the grounding terminal 7 is an example of grounding unit different from the grounding unit of the two circuits being the digital circuit block and the analog circuit block.

The control signal inputted through the control signal input terminal 42 is transmitted to the control circuit 41 and controls the semiconductor integrated circuit, but, when it does not control the semiconductor integrated circuit, its voltage value is undefined or is fixed to a predetermined voltage value such as a power supply voltage.

Noise generated in the synthesizer circuit 3 is propagated, by alternately combining, to the wiring pattern 4 that is formed near the synthesizer circuit 3. Such noise is propagated to the low noise amplifier circuit 2 through the wiring pattern 4, however, the influence of noise on the synthesizer circuit 3 is reduced because the capacitor 5 connected to the wiring pattern 4 leads the noise to the grounding terminal 7 whose impedance is lower than the ones of the wiring pattern 4.

As described earlier, the wiring pattern 4 that is formed near the low noise amplifier circuit 2 and near the synthesizer circuit 3 are grounded, which makes it possible to reduce the influence of noise from the synthesizer circuit 3 on the low noise amplifier circuit 2 by grounding, through the capacitor 5, the grounding terminal 7 that is independent from the grounding terminal 21 of the low noise amplifier circuit 2 and the grounding terminal 31 of the synthesizer circuit 3.

Figure 1:
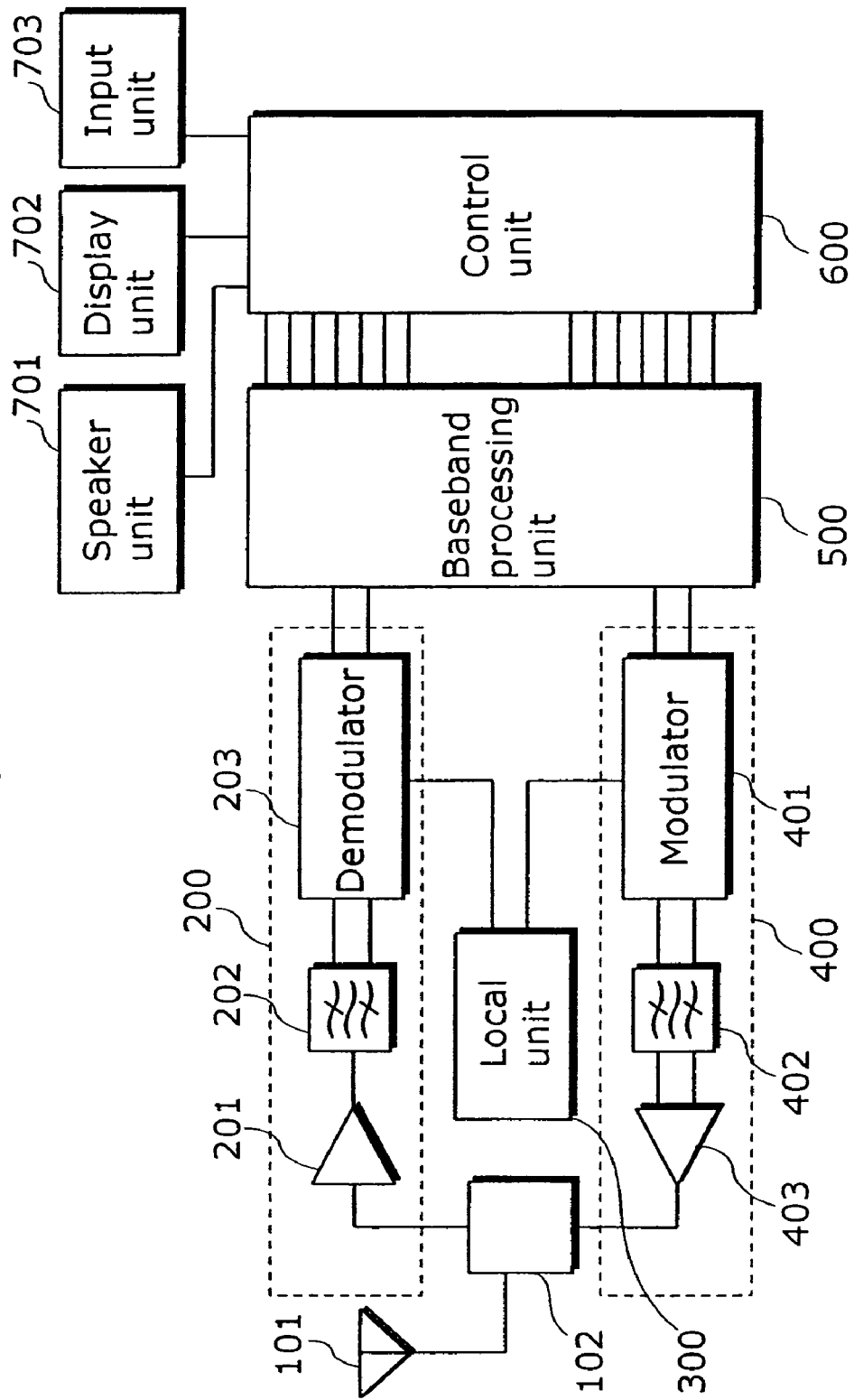
FIG. 1 is a block diagram showing a structure of a general mobile phone.
Figure 2:
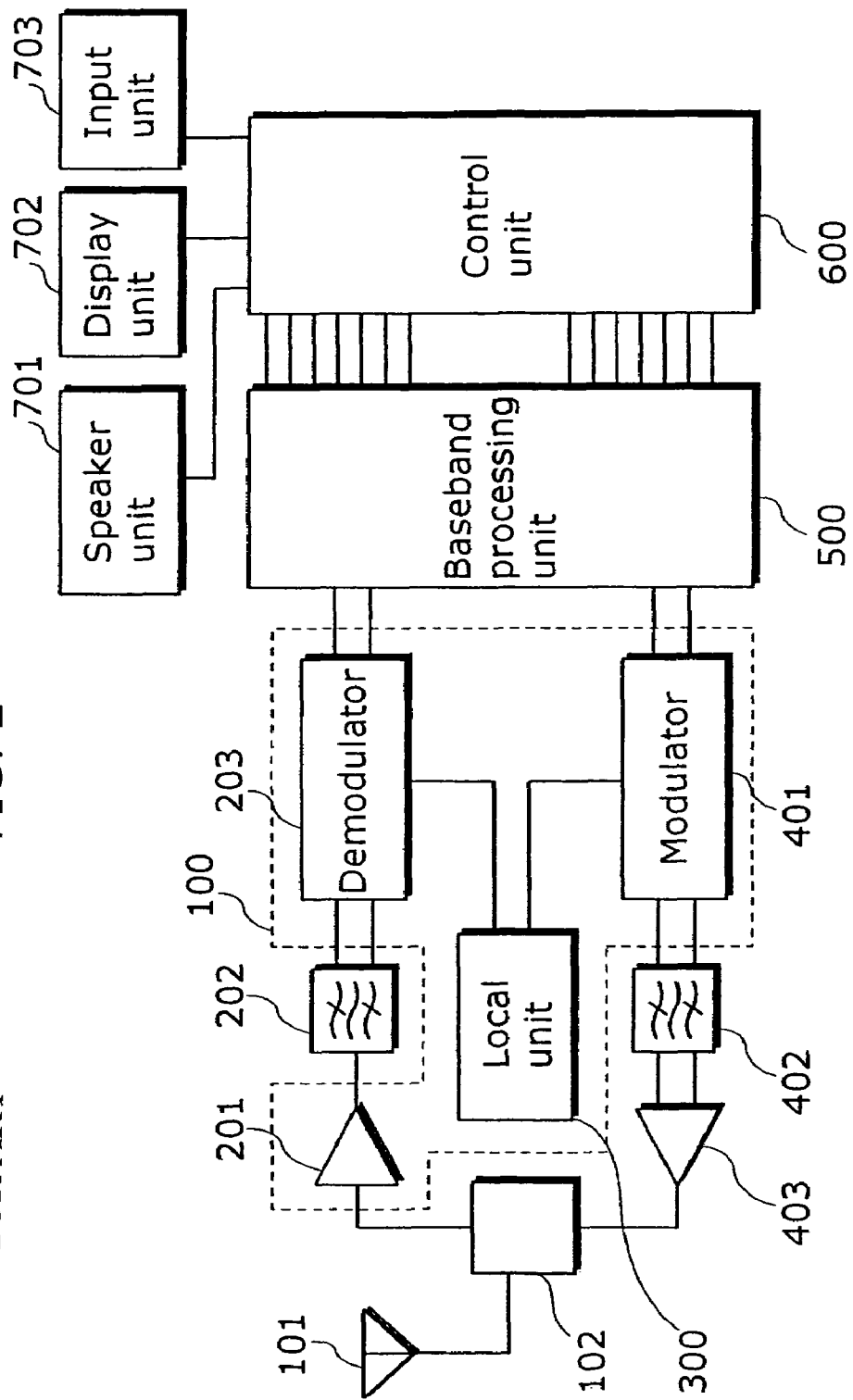
FIG. 2 is a block diagram showing another structure of a general mobile phone.

Further, in the block diagram that is FIG. 2 indicating the structure of a general mobile phone, employing this semiconductor integrated circuit as a semiconductor integrated circuit 100 makes it possible to reduce the influence of noise from the synthesizer circuit 3 that constitutes a part of the local unit 300, reduce the deterioration in the properties of the low noise amplifier 201 composed of the low noise amplifier circuit 2, and secure stable receiving properties.

Also, employing this semiconductor integrated circuit for a mobile phone base station makes it possible to secure stable receiving properties like in the case of the mobile phone.

Note that the control signal transmitted via the wiring pattern 4 is inputted through the control signal input terminal 42 and outputted to the control circuit 41. However, the control signal is not limited to the one inputted from outside this semiconductor integrated circuit, and to the one outputted to the control circuit 41.

Note that the wiring pattern 4 is grounded, through the capacitor 5, the grounding terminal 7 that is independent from the grounding terminal 21 of the low noise amplifier circuit 2 and the grounding terminal 31 of the synthesizer circuit 3. However, it is also possible to ground the grounding terminal 21 of the low noise amplifier circuit 2 through the capacitor 5 without having any independent grounding terminal. Eliminating the need to have independent terminals makes it possible to reduce the area of forming this semiconductor integrated circuit.

Second Embodiment

Figure 4:
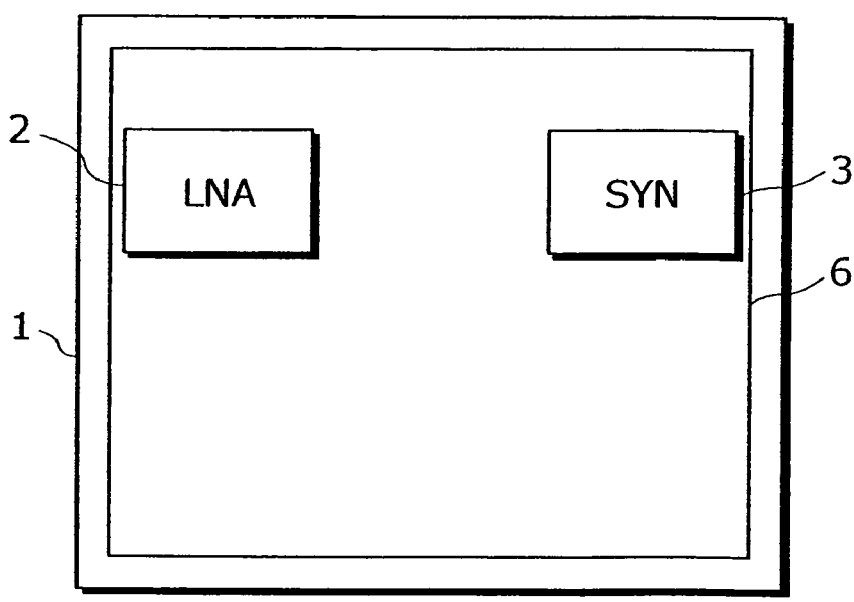
FIG. 4 is another layout diagram of a conventional semiconductor integrated circuit on a semiconductor substrate.
Figure 6:
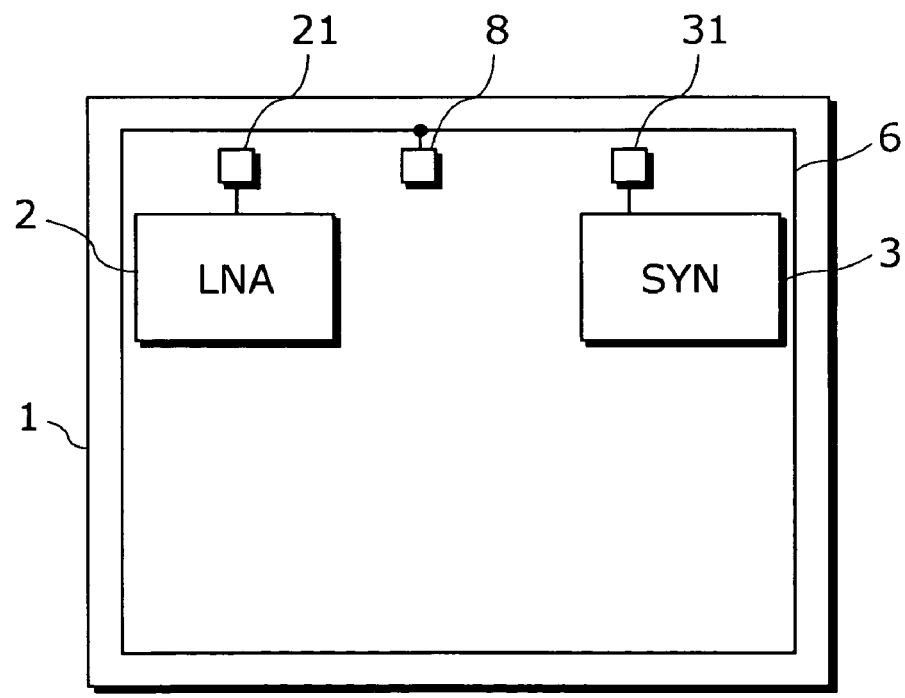
FIG. 6 is a layout diagram of a semiconductor integrated circuit on a semiconductor substrate, the layout diagram being for describing a second embodiment of the present invention.

FIG. 6 is a layout diagram of a semiconductor integrated circuit on a semiconductor substrate, the layout diagram being for describing a second embodiment of the present invention. As shown in the figure, the semiconductor integrated circuit of this embodiment is obtained by adding a grounding terminal 8 to a conventional semiconductor integrated circuit shown in the layout diagram of FIG. 4. To the parts the same as the ones in FIG. 4 the respectively corresponding reference numbers are assigned.

The semiconductor integrated circuit on the semiconductor substrate 1 includes a low noise amplification circuit 2, a synthesizer circuit 3, a seal ring 6 that is formed in the outer periphery of the semiconductor substrate 1 and that is formed near the low noise amplification circuit 2 and near the synthesizer circuit 3, a grounding terminal 21 of the low noise amplifier circuit 2, a grounding terminal 31 of the synthesizer circuit 3, and a grounding terminal 8 of the seal ring 6.

Note that, in the claims of the present invention, the low noise amplifier circuit 2 is an example of an analog circuit block, the synthesizer circuit 3 is an example of a digital circuit block, and the grounding terminal 8 is an example of a grounding unit that is different from the grounding unit of two circuit blocks being the digital circuit block and the analog circuit block.

Noise generated in the synthesizer circuit 3 is propagated, by alternately combining, to the seal ring 6 that is formed near the synthesizer circuit 3. Such noise is propagated to the low noise amplifier circuit 2 through the seal ring 6. However, the seal ring 6 is grounded at the grounding terminal 8, the noise leads to the grounding terminal 8 whose impedance is lower than the one of the seal ring 6, and thus it becomes possible to reduce the influence of noise on the low noise amplifier circuit 2.

As described earlier, the seal ring 6 that is formed near the low noise amplifier circuit 2 and near the synthesizer circuit 3 can be grounded, which makes it possible to reduce the influence of noise from the synthesizer circuit 3 on the low noise amplifier circuit 2 by grounding the grounding terminal 8 that is independent from the grounding terminal 21 of the low noise amplifier circuit 2 and the grounding terminal 31 of the synthesizer circuit 3.

Further, in the block diagram that is a block diagram in FIG. 2 indicating the structure of a general mobile phone, employing this semiconductor integrated circuit as a semiconductor integrated circuit 100 makes it possible to reduce the influence of noise from the synthesizer circuit 3 that constitutes a part of the local unit 300, reduce the deterioration in the properties of the low noise amplifier 201 composed of the low noise amplifier circuit 2, and secure stable receiving properties.

Also, employing this semiconductor integrated circuit for a mobile phone base station makes it possible to secure stable receiving properties like in the case of the mobile phone.

Note that the seal ring 6 is grounded at the grounding terminal 8, but the seal ring 6 may be alternately grounded through a capacitor like in the case of the first embodiment.

Note that the seal ring 6 is grounded at the grounding terminal 8 that is independent from the grounding terminal 21 of the low noise amplifier circuit 2 and the grounding terminal 31 of the synthesizer circuit 3. However, it is also possible to ground the grounding terminal 21 of the low noise amplifier circuit 2 without having any independent grounding terminal and ground the grounding terminal 21 of the low noise amplification circuit 2. Eliminating the need to have independent terminals makes it possible to reduce the area of forming this semiconductor integrated circuit.

Note that, in the first and the second embodiments, the low noise amplifier circuit 2 is employed as an example of an analog circuit block in the claims of the present invention. However, it is not limited to the low noise amplifier circuit 2, in other words, another one can be employed as long as it is a circuit whose properties deteriorate affected by noise in such as a voltage control oscillation circuit.

Note that, in the first and the second embodiments, the synthesizer circuit 3 is employed as an example of a digital circuit block in the claims of the present invention. However, it is not limited to the synthesizer circuit 3, in other words, another one can be employed as long as it is a circuit in which noise is generated when a circuit such as a logic control circuit operates.

Note that, in the first and the second embodiments, the case where the noise affects the analog circuit block has been described, but the case where the noise affects the digital circuit block may be described in a similar way.

Note that, in the first and the second embodiments, a mobile phone and a mobile phone base station for which the semiconductor integrated circuit of the present invention is employed have already been described, but the present invention may be employed for a mobile communication terminal and a mobile communication base station except the mobile phone.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

As described earlier, the present invention is useful for a semiconductor integrated circuit into which an analog circuit block and a digital circuit block are integrated.

What is claimed is:
1. A semiconductor intergrated circuit comprising:
a semiconductor substrate having outer periphery;

a grounding terminal formed on said semiconductor substrate inside of said outer periphery of said semiconductor substrate;
a digital circuit block formed on said semiconductor substrate inside of said outer periphery of said semiconductor substrate;
an analog circuit block formed on said semiconductor substrate inside of said outer periphery of said semiconductor substrate;
a seal ring, formed at said outer periphery of said semiconductor substrate around said digital circuit block, said analog cicruit block, and said grounding terminal, and adjacent to both said digital circuit block and said analog circuit block;
a first wiring pattern formed on said semiconductor substrate inside said outer periphery of said semiconductor substrate and connected to said seal ring and said grounding terminal; and
a capacitor on said semiconductor substrate, said capacitor having a first end and a second end;
wherein said first wiring pattern includes: a second wiring pattern connected to the first end of said capacitor; and a third wiring pattern connected to the second end of said capacitor and said grounding terminal.

2. A semiconductor intergrated circuit comprising:
a semiconductor substrate having an outer periphery:
a grounding terminal formed on said semiconductor substrate inside of said outer periphery of said semiconductor substrate;
a digital circuit block formed on said semiconductor substrate inside of said outer periphery of said semiconductor substrate;
an analog circuit block formed on said semiconductor substrate inside of outer periphery of said semiconductor substrate;
a seal ring, formed at said outer periphery of said semiconductor substrate around said digital circuit block, said analog circuit block, and said grounding terminal, and adjacent to both said digital circuit block and said analog circuit block;
a first wiring pattern formed on said semiconductor substrate inside of said outer periphery of said semiconductor substrate and connected to said seal ring and said grounding terminal; and
a digital-circuit-block grounding terminal; and
an analog-circuit-block grounding terminal,
wherein said grounding terminal connected to said first wiring pattern is a different grounding terminal than the digital-circuit-block grounding terminal and the analog-circuit-block grounding terminal.

* * * * *